United States Patent [19]

Sekino et al.

[11] 4,293,419
[45] Oct. 6, 1981

[54] HOLLOW FIBER MEMBRANE SEPARATION APPARATUS

[75] Inventors: Masaaki Sekino; Kenichi Chikanari, both of Otsu; Tsukasa Taniyama, Kyoto, all of Japan

[73] Assignee: Toyo Boseki Kabushiki Kaisha, Japan

[21] Appl. No.: 119,235

[22] Filed: Feb. 6, 1980

[51] Int. Cl.³ .............................................. B01D 31/00
[52] U.S. Cl. ................................ 210/321.1; 210/323.1; 210/433.2; 55/158
[58] Field of Search .......... 210/321 R, 433 M, 323 T, 210/323 R; 55/158, 16

[56] References Cited

U.S. PATENT DOCUMENTS

| | | | |
|---|---|---|---|
| 2,961,062 | 11/1960 | Hunter | 55/158 |
| 3,135,591 | 6/1964 | Jones | 55/158 |
| 3,422,008 | 1/1969 | McLain | 55/158 |
| 3,503,515 | 3/1970 | Tomsic | 210/321 R |
| 4,080,296 | 3/1978 | Clark | 210/323 T |
| 4,220,535 | 9/1980 | Leonard | 55/158 |

Primary Examiner—Ivars C. Cintins
Assistant Examiner—E. Rollins Cross
Attorney, Agent, or Firm—Jones, Tullar & Cooper

[57] ABSTRACT

A large-sized hollow fiber membrane separation apparatus suitable for treating a large amount of fluid without any defect, such as pressure loss of fluid, a concentration polarization phenomenon and the like, which comprises a cylindrical pressure container divided into two longitudinally aligning compartments by a dividing member at the substantial longitudinal center portion thereof; two columnar hollow fiber assemblies longitudinally aligned and placed in the compartments, respectively; said dividing member having functions to seal the compartments in a fluid-sealing condition, to feed fluid to be treated and to discharge fluid which does not permeate through the hollow fiber membrane during membrane separation in the compartments and being directly connected to external pipings through opening provided to the side wall of the container at the substantial longitudinal center portion thereof.

4 Claims, 7 Drawing Figures (a) (b)

(a) (b)

HOLLOW FIBER MEMBRANE SEPARATION APPARATUS

The present invention relates to a membrane separation apparatus with a plurality of hollow fiber assemblies comprising hollow fibers having a selective permeability to fluid. More particularly, it relates to enlargement of a hollow fiber membrane apparatus in order to adapt for industrial performance.

A membrane separation process is a kind of method for separating a certain material in fluid and utilizes a semipermeable membrane having a selective permeability to fluid to be treated. Practically, the process includes various techniques, such as reverse osmosis, ultrafiltration, dialysis, gas separation and the like. Membrane separation apparatuses employed for carrying out these techniques are classified into flat membrane-type, tubular-type, spiral-type and hollow fiber-type according to the shape and form of the semipermeable membrane used therein. Among these, a hollow fiber-type apparatus has very high membrane separation efficiency per unit volume of the apparatus since no substrate for the semipermeable membrane is needed.

Besides, like other conventional techniques, there is a tendency to enlarge an apparatus to be used in the membrane separation techniques in order to adapt it for industrial performance. Particularly, enlargement of a hollow fiber-type apparatus is of great advantage to adapt it for industrial performance since the apparatus has high volumetric efficiency as described above. The term "a large-sized apparatus" used herein means a hollow fiber membrane separation apparatus whose size is twice to several times larger than that of the largest conventional apparatus. Therefore, the larger-size apparatus can treat a much larger amount of fluid than that by any conventional apparatus. In comparison with a conventional apparatus, such a large-sized apparatus has many advantages, such as (1) the cost per unit volume of the apparatus can be reduced; (2) the steps of manufacturing process of a hollow fiber assembly can be reduced; (3) external pipings, valves and instruments equipped around the apparatus can be reduced and the like. Accordingly, in case of carrying out a large-scale membrane separation treatment, a large-sized apparatus, which needs fewer parts than those of a conventional apparatus, is desired.

To enlarge a hollow fiber membrane separation apparatus, there are two ways. One is elongation of the apparatus. The other is enlargement of the bore diameter thereof. However, when the apparatus is elongated, fluid to be treated is difficult to flow through inside of the hollow fiber since the distance between opening ends of the hollow fiber becomes long and pressure loss of the fluid is increased. On the other hand, when the bore diameter of the apparatus is enlarged, the apparatus is apt to cause a concentration polarization phenomenon at the areas where the flow rate of the fluid to be treated is small or the fluid stays since the flow of the fluid through the hollow fiber layer becomes uneven between the inner portion and the outer portion in the layer. Thus, if the above pressure loss of fluid or the concentration polarization phenomenon occurs by enlargement of the membrane separation apparatus, a permeation flow rate of the fluid through the membrane is lowered, which results in inhibition of a permeation capacity of the hollow fiber membrane used.

The main object of the present invention is to provide a large-sized hollow fiber membrane separation apparatus which keeps the above-described advantages (1) to (3) with minimum pressure loss and the concentration polarization phenomenon. This objective as well as other objects and advantages of the present invention will become apparent to those skilled in the art from the following description by reference to the accompanying drawings in which.

Figure 1:
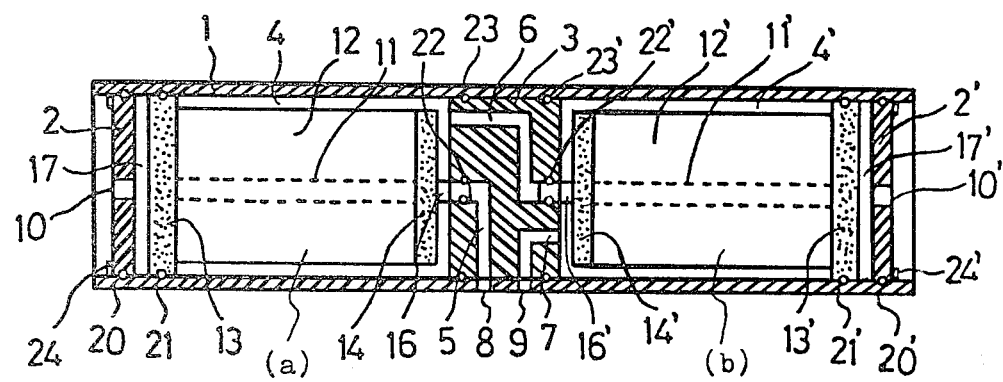
FIG. 1 is a longitudinal section of an embodiment of the hollow fiber membrane separation apparatus provided by the present invention.

According to the present invention, there is provided a hollow fiber membrane separation apparatus which comprises:

a pressure container composed of a cylindrical shell and end plates which seal both opening ends of the shell, respectively;

a dividing member provided at the substantial center portion in the container which divides the container into two longitudinally aligning compartments;

Two columnar hollow fiber assemblies which are longitudinally aligned and placed in the compartments, respectively (hereinafter referred to as hollow fiber assembly (a) and (b));

each of said columnar hollow fiber assemblies (a) and (b) having an elongate member through which fluid to be treated can flow, hollow fiber layers formed by a plurality of hollow fibers having a selective permeability to fluid axially and radially extending at the peripheral portion of the elongate member, a conduit connected to the elongate member at the end thereof faced to the dividing member, and a resin wall radially extending at the other end faced to the end plate;

the terminals of said hollow fibers being opening outward thrusting through the resin wall and said terminal openings of the follow fibers being connected to the space formed by the surrounding wall, inner surface of the cylindrical shell and end plate;

said dividing member having therein an inlet passage through which the fluid to be treated is feeded and an outlet passage through which the fluid treated in the compartment is discharged;

said dividing member being set within the shell with a clearance between the dividing member and the inner surface of the shell, said clearance being sealed with a plurality of sealing members so that the compartments are fluid-sealed from outside, and external pipings being directly connected to the passages in the dividing member through openings of the shell; and said end plate having an opening through which the fluid permeated through the hollow fiber membrane is discharged.

The hollow fiber assembly used in the present invention is as follows:

The elongate member is a columnar core material through which the fluid to be treated can flow both axial and radial direction. For example, it may be dispersing pipe, such as a hollow cylindrical core pipe having many holes on the side wall thereof or a cylinder made of wires, a non-hollow bar-like material having axially extending projections or the like.

The hollow fiber layers are formed by arranging lines of the hollow fiber on the peripheral portion of the elongate member in such a manner that, for example, the hollow fiber is axially traversed on the outer surface of the elongate member from one end to the other end thereof in substantially parallel to or at an angle of about 10 to 45 degree inclined to the longitudinal axis of the member, or spirally wound around the peripheral portion of the member.

The resin wall is provided at one end of the assembly and processed in such a manner that the terminals of the hollow fibers open outward thrushing through the wall. At the other end, the hollow fibers forms loops and the conduit is connected to the elongate member.

Now, preferred embodiments of the present invention are illustrated by reference to the accompanying drawings.

FIG. 1 illustrates an embodiment of the hollow fiber membrane separation apparatus of the present invention. The apparatus has a pressure container 1 which is divided into two longitudinally aligned compartments 4 and 4' by a dividing member 3 provided at the substantial center portion in the container and two columnar hollow fiber assemblies (a) and (b) are placed in the compartments 4 and 4', respectively. In the left hand of FIG. 1, an end plate 2 has an opening 10 connected to a space 17 where terminals of the hollow fibers of the assembly (a) are opened. The end plate is supported by the inner surface of the cylindrical shell of the container by means of a snap-ring 24. Conduit 16 which is connected to an elongate member 11 of the assembly (a) is fitted to passage 5 in dividing member 3. Passage 5 is connected to an external piping (not shown) through an opening 8 of the container. Two compartments 4 and 4' are connected to each other by passage 6 in dividing member 3. As sealing members, a plurality of O-rings 20, 21, 22 and 23 are provided so as to maintain the compartments in a fluid-sealing condition. The construction of the right hand in FIG. 1 is symmetrical to that of the left hand and (b) is a hollow fiber assembly, 12' is hollow fiber layers, 2' is an end plate, 11' is an elongate member, 13' and 14' are resin walls, 16' is a conduit, 17' is a space, 9 and 10' are openings, 7 is a passage, 20', 21', 22' and 23' are O-rings and 24' is a snap-ring.

When reverse osmosis is carried out by using the apparatus of FIG. 1, the fluid to be treated can be fed via either opening 8 or 9. In case of feeding the fluid via opening 8, the fluid to be treated is led into hollow fiber layers 12 of assembly (a) through passage 5 in dividing member 3, conduit 16 and elongate member 11. In hollow fiber layer 12, the fluid is subjected to reverse osmosis separation through the hollow fiber membranes. The fluid permeated through the hollow fiber membrane flows through inside of the fiber, flows into space 17 through terminal opening 15 of the fiber (see FIG. 2) at the resin wall of assembly (a) and then, is discharged out of the apparatus through opening 10. On the other hand, the fluid which does not permeate through the hollow fiber membrane radially crosses the hollow fiber layers toward the outer surface thereof and then is transferred from compartment 4 to the other compartment 4' through passage 6 in dividing member 3.

Likewise, in compartment 4', the transferred fluid is led into hollow fiber layers 12' of assembly (b) through conduit 16' and elongate member 11' and further subjected to reverse osmosis separation through the hollow fiber membranes. The fluid permeated through the membrane flows through inside of the hollow fiber into space 17' and then, is discharged out of the apparatus through opening 10'. The fluid which does not permeate through the hollow fiber membrane crosses the layers and is discharged out of the apparatus through passage 7 in dividing member 3 and opening 9.

In case of feeding the fluid to be treated via opening 9, the fluid flows in the reverse direction to the above. That is, the fluid is firstly led into compartment 4' via opening 9 and subjected to membrane separation in hollow fiber layers 12'. After this treatment, the fluid which does not permeate through the hollow fiber membrane is transferred to compartment 4 through elongate member 11', conduit 16' and passage 6 in dividing member 3. The fluid is further subjected to membrane separation in hollow fiber layers 12. The fluid which does not permeate through the hollow fiber membrane in layers 12 is discharged out of the apparatus through elongate member 11, conduit 16, passage 5 in dividing member 3 and opening 8. On the other hand, the fluid permeated through the hollow fiber membrane flows through inside of the hollow fiber and then, is discharged out of the apparatus through openings 10 and 10'.

Figure 2:
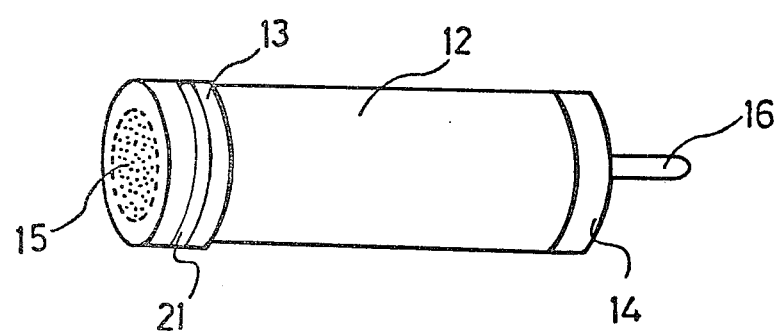
FIG. 2 is a prospective view of an embodiment of a hollow fiber assembly used in the apparatus illustrated in FIG. 1.

FIG. 2 illustrates an embodiment of the hollow fiber assembly used in the present invention. This assembly has hollow fiber layers 12, conduit 16 connected to the elongate member (not shown) and resin walls 13 and 14. The hollow fiber layers are formed by arranging lines of the hollow fiber on the peripheral portion of the elongate member, which is a core pipe having many holes on the side wall thereof, in such a manner that the hollow fiber is spirally wound around the peripheral portion of the member by traversing the fiber from one end to the other end on the member. The terminals of the hollow fibers open outward thrusting through resin wall 13 to form opening edge face 15. At the other end of the assembly, conduit 16 is connected to the elongate member thrusting through resin wall 14.

Figure 3:
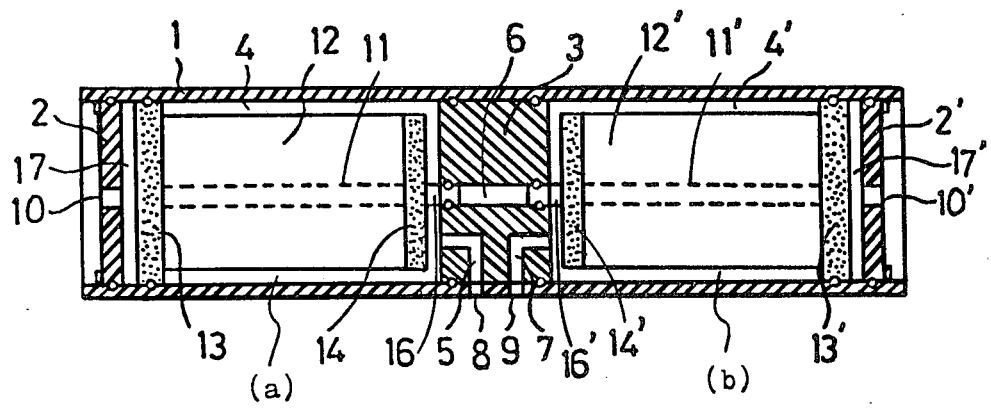
FIGS. 3, 4 and 5 are longitudinal sections of other embodiments of the apparatus provided by the present invention, respectively.
Figure 4:
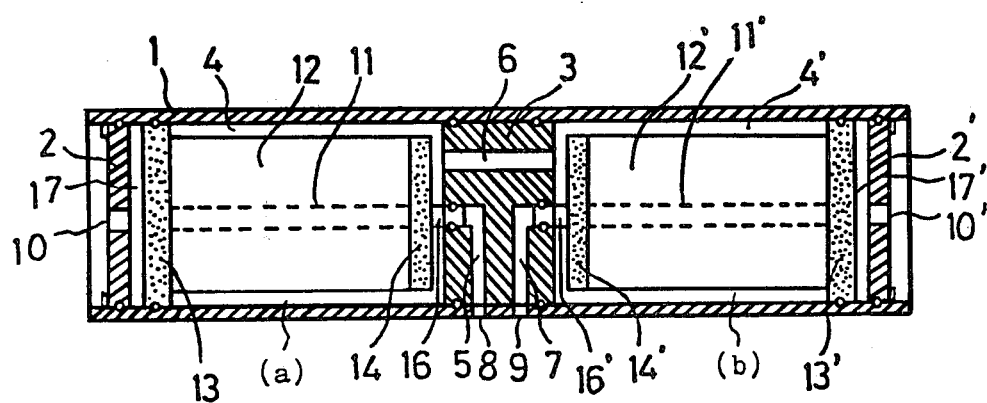

FIGS. 3 and 4 illustrate other embodiments of the apparatus of the present invention. In these embodiments, the fluid to be treated which is feeded via opening 8 is also led into hollow fiber assembly (a) in compartment 4 and subjected to membrane separation therein. The fluid which does not permeate through the hollow fiber membrane is transferred to compartment 4' through passage 6 in dividing member 3 and further subjected to membrane separation in hollow fiber assembly (b). After this treatment, the fluid which does not permeate through the hollow fiber membrane is discharged out of the apparatus through passage 7 in dividing member 3 and opening 9. On the other hand, the fluid permeated through the hollow fiber membrane is discharged out of the apparatus through openings 10 and 10'. Particularly, the apparatus shown in FIG. 4 is preferable since compartments 4 and 4' are directly connected to each other by passage 6 in dividing member 3 and thereby, pressure of both compartments 4 and 4' are balanced and dividing member 3 is readily secured.

Figure 5:
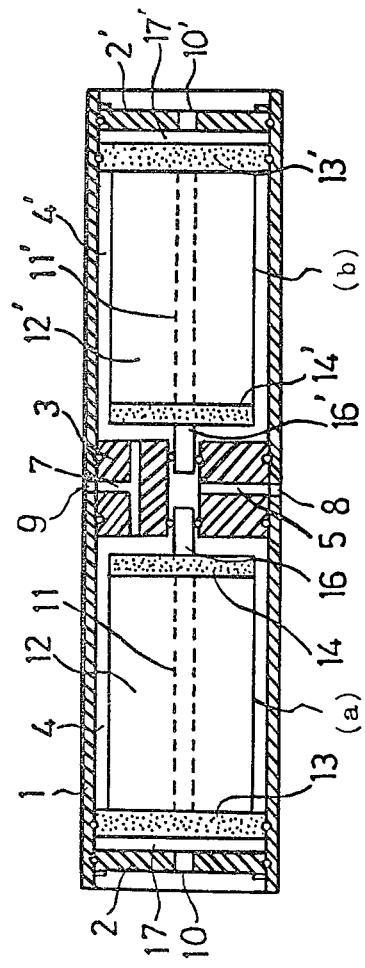

FIG. 5 illustrates another embodiment of the present invention. This embodiment shows another constitution of the dividing member in which the fluid to be treated can simultaneously flow into both hollow fiber assemblies (a) and (b) through passage 5 and conduits 16 and 16'. The fluid to be treated is feeded via opening 8, simultaneously led into hollow fiber assemblies (a) and (b) and subjected to membrane separation in hollow fiber layers 12 and 12'. The fluid which does not permeate through the hollow fiber membrane is discharged out of the apparatus through passage 7 in dividing member 3 and opening 9. On the other hand, the fluid permeated through the membrane is discharged out of the apparatus through openings 10 and 10'.

Figure 6:
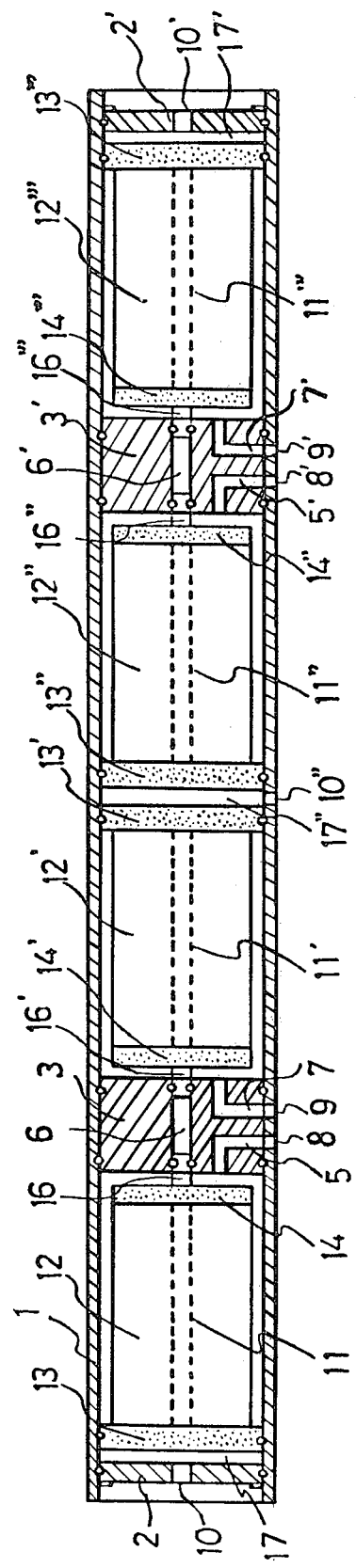
FIG. 6 is a longitudinal section of another embodiment of the apparatus provided by the present invention having increased number of hollow fiber assemblies.

Basically, in the hollow fiber membrane separation apparatus of the present invention, the dividing member having passages is provided in the pressure container and two hollow fiber assemblies are set up in the container in such the manner that the conduits of the assemblies are facing each other through the dividing member. However, an apparatus having an increased number of the hollow fiber assemblies can be assembled by providing a plurality of sets of one dividing member and two hollow fiber assemblies in one pressure container. Such an apparatus is also included in the scope of the present invention. In FIG. 6, one embodiment of this feature is illustrated. That is, the apparatus has four hollow fiber assemblies in pressure container 1. Dividing members 3 and 3' are the same as that in FIG. 3. The fluid to be treated is supplied via openings 8 and 8' and subjected to membrane separation in each two of the hollow fiber assemblies. The fluid which does not permeate through the hollow fiber membrane is discharged out of the apparatus through openings 9 and 9'. On the other hand, the fluid permeated through the membrane flows through inside of the hollow fiber and is discharged out of the apparatus through openings 10, 10' and 10". In such an apparatus having increased number of hollow fiber assemblies (not less than four), although external pipings are somewhat complicated, the advantages of the apparatuses shown in FIGS. 1 and 3 to 5 are further enhanced.

In the present invention, enlargement of the apparatus can be attained by setting up a plurality of the hollow fiber assemblies in the pressure container. Therefore, the problems, such as the pressure loss of the fluid or the concentration polarization, which are apt to occur in a conventional apparatus enlarged by elongation thereof or enlargement of the bore diameter thereof, are solved in the apparatus of the present invention.

Particularly, in the apparatus as shown in FIG. 1, 3, 4 or 6, throughput capacity of each two hollow fiber assemblies can be fully displayed since the fluid is treated in series as it is firstly subjected to membrane separation in one assembly and then, further subjected to membrane separation in the other assembly. Therefore, a large amount of the fluid can be treated by the apparatus of the present invention whereas it is impossible in a conventional apparatus. Further, by using the dividing member, difficulties in assembling an apparatus having a plurality of hollow fiber assemblies in one container can be readily eliminated and the complete sealing mechanism needed in a membrane separation apparatus can be readily provided. Moreover, the cost per unit volume of an apparatus can be reduced and the cost and space of external pipings, valves and the like equipped around an apparatus can also be reduced in the apparatus of the present invention.

In the present invention, the functions of the dividing member are to feed the fluid to be treated from out of the apparatus and to discharge the fluid which does not permeate through the hollow fiber membrane during membrane separation in the compartment. The clearance between the dividing member and the inner surface of the cylindrical shell is completely sealed.

Figure 7:
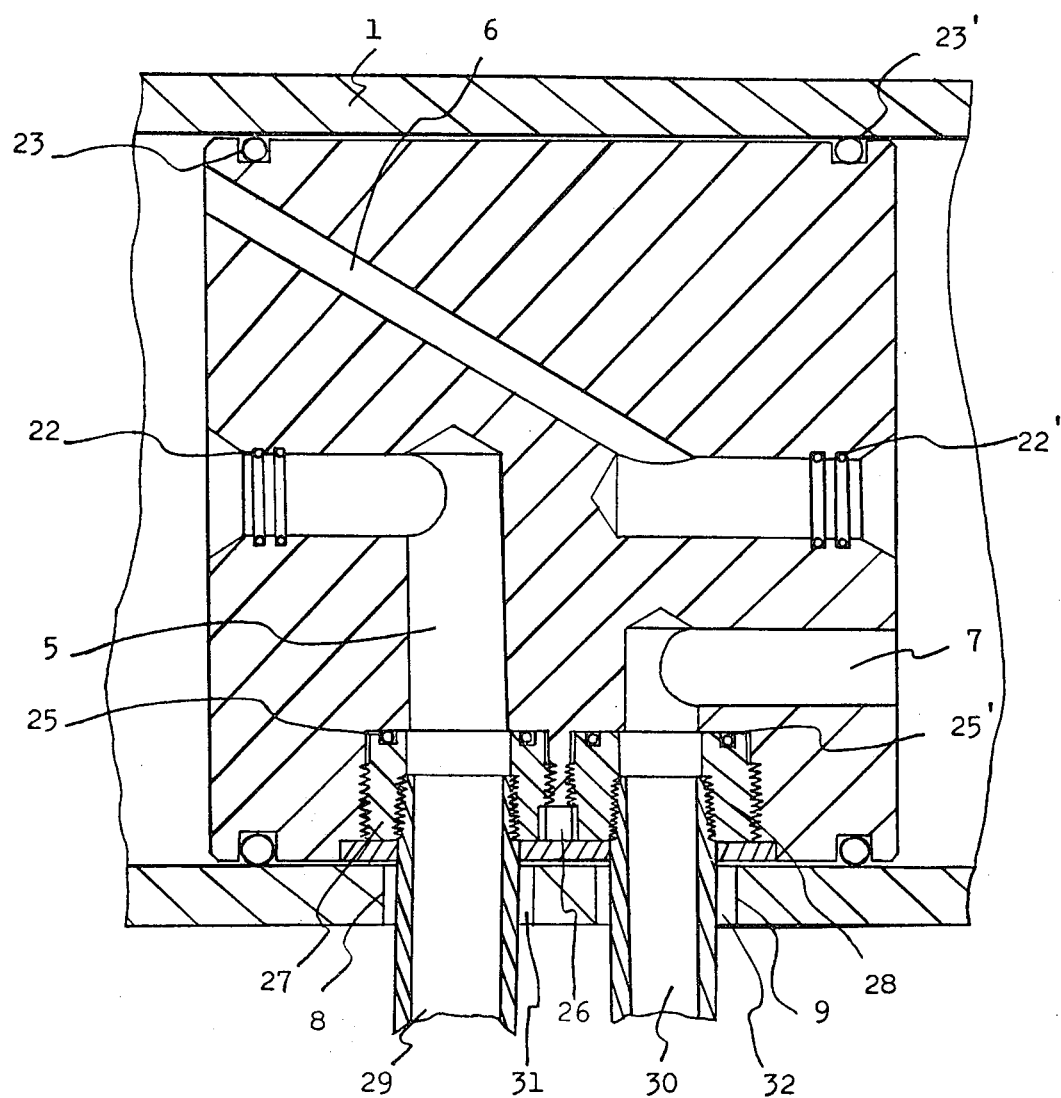
FIG. 7 is an enlargement longitudinal section of an embodiment of a dividing member used in the apparatus provided by the present invention.

FIG. 7 illustrates one embodiment of the dividing member used in the present invention in detail. In FIG. 7, there are provided O-rings 23 and 23' as sealing members. External pipings 29 and 30 are directly connected to end blocks 27 and 28 of passages 5 and 7 in dividing member 3 by means of thread engagement. Blocks 27 and 28 are also secured to the body of dividing member 3 by means of thread engagement and the clearance between the blocks and the body is sealed by O-rings 25 and 25'. Stopper bolt 26 is inserted into the portion between blocks 27 and 28 in order to prevent rotation of the block along with the external piping at the time of connecting and removing the piping. The reasons why the blocks and the body of the dividing member are separately constituted are to improve the thread strength and the form retention of the thread and to reduce the material cost. That is, when the blocks and the body of the dividing member are separately constituted, the body can be made of a cheaper material and the blocks can be made of a material having high strength to prevent deformation of the thread caused by repetition of connecting and removing the pipings. Due to such the constitution of the dividing member, the apparatus can readily be assembled. Moreover, the space surrounded by container 1, the peripheral portion of dividing member 3 and O-rings 23 and 23' is opened to outside of the apparatus under the atmosphere pressure through clearances 31 and 32 formed between the outer surfaces of the side walls of pipings 29 and 30 and the inner surfaces of openings 8 and 9 on container 1, respectively. Thus, when the external pipings are directly attached to openings 8 and 9 on the container which has relatively lower strength, the connecting portion is apt to be broken by a high inner pressure, but such the defect can be eliminated in the apparatus of the present invention.

The hollow fibers used in the present invention are not critical but they should have a selective permeability to fluid. Preferably, an outer diameter thereof is 10 to 1,000 microns and a hollow percentage is 3 to 80%. As a material of the hollow fiber, various kinds of polymers, such as celluloses, cellulose-esters, cellulose-ethers, polyamides, silicones, vinyls and the like can be used.

In the present invention, the resin plate is preferably made of a resin which is liquid having fluidity before curing and solidified by curing to become a hard solid. The typical examples of the resin are an epoxy resin, a silicone resin, a polyurethane resin, an unsaturated polyester resin and the like.

The dividing member used in the present invention can be made of a material, such as metal, a resin or the like and thickness thereof is not critical.

The pressure container used in the present invention is preferably a cylindrical container having 20 to 500 mm in diameter and 200 to 5,000 mm in length but the shape thereof is not limited to be cylindrical.

The hollow fiber membrane separation apparatus of the present invention is applied to, for example, desalination of sea water, desalination of brackish water, purification of various kinds of waste water, reverse osmosis such as preparation of sterilized water, ultrafiltration such as recovery of paint from waste water in electrodeposition painting, liquid permeation such as separation of para-xylene from a xylene mixture, gas permeation such as recovery of helium and purification of hydrogen, and the like. In any case, it is possible to carry out efficiently a large-scale treatment by using the apparatus of the present invention.

The invention being thus described, it will be obvious that the same way be varied in many ways. Such modifications are not to be regarded as a departure from the spirit and scope of the present invention, and all such modifications are intended to be included within the scope of the following claims.

What is claimed is:

1. A hollow fiber membrane separation apparatus which comprises:
    a pressure container composed of a cylindrical shell and end plates which seal both opening ends of the tube, respectively;
    a dividing member provided at the substantial center portion in the container which divides the container into two longitudinally aligning compartments;
    two columnar hollow fiber assemblies which are longitudinally aligning and placed in the compartments, respectively;
    each of said columnar hollow fiber assemblies having an elongate member through which fluid to be treated can flow, hollow fiber layers formed by a plurality of hollow fibers having a selective permeability to fluid axially and radially extending at the peripheral portion of the elongate member, a conduit connected to the elongate member at the end thereof faced to the dividing member, and a resin wall radially extending at the other end faced to the end plate;
    the terminals of said hollow fibers being open outward thrusting through the resin wall and said terminal openings of the follow fibers being connected to the space formed by the surrounding wall, inner surface of the cylindrical shell and end plate;
    said dividing member having therein an inlet passage through which fluid to be treated is feeded and an outlet passage through which the fluid treated in the compartment is discharged;
    said dividing member being set within the shell with a clearance between the dividing member and the inner surface of the shell, said clearance being sealed with a plurality of sealing members so that the compartments are fluid-sealed from outside, and external pipings being directly connected to the passages in the dividing member through openings of the shell; and
    said end plate having an opening through which the fluid permeated through the hollow fiber membrane is discharged.

2. A hollow fiber membrane separation apparatus of claim 1, wherein the conduits of the hollow fiber assemblies are connected to the inlet passage and the outlet passage of the dividing member, respectively, and a passage which connects both compartments is provided in the dividing member.

3. A hollow fiber membrane separation apparatus of claim 1, wherein a passage which connects both compartments is provided in the dividing member and the conduit of one of the hollow fiber assemblies is connected to this passage and the conduit of the other hollow fiber assembly is connected to the inlet or outlet passage in the dividing member.

4. A hollow fiber membrane separation apparatus of claim 1, wherein a passage which connects both compartments is provided in the dividing member and the conduits of the hollow fiber assemblies are connected to this passage, respectively.

* * * * *